(12) United States Patent
Barthel et al.

(10) Patent No.: US 11,118,713 B2
(45) Date of Patent: Sep. 14, 2021

(54) CONNECTOR COMPRISING ASSEMBLY AID AND METHOD FOR PRODUCING SAID CONNECTOR

(71) Applicant: TI AUTOMOTIVE (FULDABRÜCK) GMBH, Fuldabrück (DE)

(72) Inventors: Iris Barthel, Schauenburg (DE); Kay Bube, Schenklengsfeld (DE); Andre Häckel, Waldeck (DE); Michael Weissing, Heidelberg (DE); Harald Knobloch, Heidelberg (DE)

(73) Assignee: TI AUTOMOTIVE (FULDABRÜCK) GMBH, Fuldabrück (DE)

( * ) Notice: Subject to any disclaimer, the term of this patent is extended or adjusted under 35 U.S.C. 154(b) by 557 days.

(21) Appl. No.: 16/064,591

(22) PCT Filed: Dec. 14, 2016

(86) PCT No.: PCT/EP2016/080977
§ 371 (c)(1),
(2) Date: Jun. 21, 2018

(87) PCT Pub. No.: WO2017/108530
PCT Pub. Date: Jun. 29, 2017

(65) Prior Publication Data
US 2019/0003630 A1 Jan. 3, 2019

(30) Foreign Application Priority Data
Dec. 23, 2015 (EP) .................................... 15202567

(51) Int. Cl.
*F16L 53/38* (2018.01)
*H05B 3/58* (2006.01)

(52) U.S. Cl.
CPC ................ *F16L 53/38* (2018.01); *H05B 3/58* (2013.01)

(58) Field of Classification Search
CPC . F16L 53/38; F16L 53/35; F16L 53/30; F16L 53/00; F16L 13/00; H05B 3/58
USPC .......................... 285/41, 285.1, 286.1, 286.2
See application file for complete search history.

(56) References Cited

U.S. PATENT DOCUMENTS 8,474,123 B1 * 7/2013 Wachob ............... F02M 31/125
29/527.1
2010/0144182 A1 6/2010 Dude et al.
2011/0248494 A1 10/2011 Rosenfeldt et al.

FOREIGN PATENT DOCUMENTS

DE 20 2014 105908 U1 1/2015

* cited by examiner

*Primary Examiner* — Aaron M Dunwoody
(74) *Attorney, Agent, or Firm* — Dickinson Wright PLLC

(57) ABSTRACT

A connector includes a connection part formed with two connection ends, an assembly aid and an encapsulation. The inner channel of the connection part connects the connection ends to each other for the purpose of the passage of a fluid medium. The connection part has a middle section between the connection ends, and the assembly aid is arranged at least in a partial region of the middle section on the outside of the connection part. A heating means is arranged on the assembly aid, and the encapsulation covers at least a portion of the heating means. Further, the assembly aid is arranged on the connection part by means of force-fitting.

14 Claims, 2 Drawing Sheets

CONNECTOR COMPRISING ASSEMBLY AID AND METHOD FOR PRODUCING SAID CONNECTOR

RELATED APPLICATIONS

This application is a 35 U.S.C. § 371 national phase application of International Application No. PCT/EP2016/080977, filed on Dec. 14, 2016, which claims the priority of European Patent Application No. 15202567.2, filed Dec. 23, 2015, the contents of which are incorporated herein by reference in their entirety.

FIELD

The present disclosure relates to a connector, in particular, a quick connector for fluid media of a motor vehicle and, in particular for a urea solution. The present disclosure further relates to a method for producing the connector.

BACKGROUND

It is proposed in EP 2 347 163 B1 that an assembly aid on a connection part is to be latched or to be pushed. The assembly aid is accordingly rigidly formed and is pushed either in an axial or in a radial direction at the middle section of the connection part. Subsequently then, for example, a heating wire can be helically wound around the assembly aid. However, we have discovered the following with this arrangement. A disadvantage here is that the assembly aid needs an elaborately designed latching means to secure the assembly aid reliably on the connection part. Likewise, it requires a specially adjusted opposite latching means on the connection part. However, the latching means represents potential sources of error because they are relatively delicately formed and are responsible for a certain part of the assembly for this reason. In addition, we have found that errors can occur in an insufficient latching-movement, so that no or only insufficient latching connection is formed. Further, a heating wire or heating means in the assembly aid may easily slip, which is also undesirable because, for example, an uneven surface distribution of the heating wire can occur.

SUMMARY

Therefore, the present disclosure provides a connector in which the disadvantages described above can be avoided. In particular, the present disclosure provides a modular system, in which the connection part can be combined with several different types of assembly aids. Preferably, the present disclosure is, based on the technical problem, to ensure the best possible connection between the connection part, assembly aid and heating means, in order to reduce the waste or manufacturing costs.

To solve the technical problem that we have discovered, the present disclosure teaches a connector, in particular, a quick connector, for a fluid medium of a motor vehicle, in particular, for a urea solution, wherein the connector has a connection part, an assembly aid and an encapsulation, wherein the connection part comprises two connection ends, wherein an inner channel connects the connection ends with each other for the passage of a fluid medium, wherein the connection part comprises a middle section between the connection ends, wherein the assembly aid is arranged at least in a partial area of the middle section on the outer side of the connection part, wherein a heating means is arranged on the assembly aid, wherein the encapsulation covers at least a portion of the heating means, and wherein the assembly aid is arranged on the connection part by means of force-fitting.

As fluid media, for example, windshield wiper water or urea solutions can be considered. The term "urea solution" particularly includes the products AdBlue® or Diesel Exhaust Fluid (DEF). As a "connector", this part is preferably understood as something that connects a pipe to another pipe or a pipe to a component. "Components" are, for example, tanks, nozzles or pumps. The term "quick connector" preferably means that at least one connection end is formed as part of a releasable latching connection. A heating means is preferably an electrical heating means. As an electric heating means, for example, heating wires, heating foils, PTC- or NTC-resistors come into consideration. Preferably, the electrical heating means comprises at least one heating wire.

The term "force-fitting" preferably means that the assembly aid is seated on the connection part in such a way that it is immovably arranged on the connection part. Preferably, the assembly aid is fastened on the connector by means of force-fitting. It is preferred that the assembly aid is fastened mainly by means of force-fitting on the connection part. The term "force-fitting" includes, for example, shrinking pipes. It is particularly advantageous that the assembly aid and the connection part are formed in such a way that the assembly aid would not be fastened to the connection part without force-fitting. The term "fastened" means, in particular, that the assembly aid is arranged in the axial and preferably also in the radial direction without free play. The term "fastened" specifically means that the assembly aid can be removed by hand from the connection part. Very particularly preferably, the assembly aid is not arranged by means of a material bonding to the connection part. Advantageously, the assembly aid is not arranged by means of a latching connection to the connection part. The term "latching connection" is preferably to be understood as that rigid but resiliently formed latching elements undergoes form-fitting due to resilient restoring action.

According to one preferred embodiment, the assembly aid is rubber-like elastically formed. The term "rubber-like" means, in particular, that the assembly aid can be stretched by hand in the axial direction and/or radial direction. It is convenient that the assembly aid consists of a softer material than the connection part. According to a preferred embodiment, the assembly aid comprises an elastomer, and preferably a thermoplastic elastomer. Preferably, the assembly aid comprises an olefin-based thermoplastic elastomer and/or a crosslinked olefin-based thermoplastic elastomer and/or a urethane-based thermoplastic elastomer, and/or a thermoplastic polyester elastomer and/or a thermoplastic copolyester and/or styrene block copolymers and/or thermoplastic copolyamides.

According to another preferred embodiment, the assembly aid is on the connection part under a preferably radially oriented tension. It is possible that the assembly aid is non-destructively removed from the connector. Advantageously, at least along an axial length section of the assembly aid is a full radial tension. The term "full radial tension" means, in particular, that the tension acts around the connection part along a full rotation of the assembly aid. Preferably, the assembly aid stands under a full-scale radial tension at least along the half of the axial length of the assembly aid, and preferably along the full axial length of the assembly aid. It is very particularly preferred that the tension is caused by a shrinkage of the assembly aid.

Preferably, the shrinkage is generated around the connection part by molding the assembly aid material, due to the cooling of the assembly aid material. Very advantageously, the removed assembly aid is not pushed onto the connector.

According to the first embodiment, the assembly aid is not pushed onto the connection part, because due to a shrinkage of the inner diameter of the assembly aid it is less than that of the outer diameter of the connection part. According to another embodiment, the assembly aid is not to be pushed onto the connection part, because the force-fitting is so strong that the assembly aid would be destroyed by pulling it off. Preferably, the assembly aid is, in particular, not to be pushed in the axial direction. According to another embodiment, the assembly aid is a rubber-like sleeve to be pulled on the connection part, which sleeve preferably has an inner diameter, which is less than the associated outer diameter of the connection part.

It is within the scope of the present disclosure that the melting temperature $T_{MM}$ of the assembly aid material is lower than the melting temperature $T_{MA}$ of the connection part material. Preferably, the melting temperature $T_{MK}$ of the encapsulating material is lower than/equal to the melting temperature TMM of the assembly aid material. According to a particularly preferred embodiment, the melting temperature $T_{MK}$ of the encapsulating material is equal to the melting temperature $T_{MM}$ of the assembly aid material. According to another embodiment, the melting temperature $T_{MK}$ of the encapsulation material is higher than the melting temperature $T_{MM}$ of the assembly aid material.

It is advantageous that the cross section of the inner surface of the assembly aid facing the connection part is constant over at least one contiguous third, more preferably over at least one contiguous half, and most preferably over the entire length of the axial length of the assembly aid. Preferably, at least one partial section, more preferably at least one third, even more preferably at least half, and preferably the full length of the middle section is cylindrically formed. It is preferable that the area of the connection part covered by the assembly aid is cylindrically formed throughout and, in particular, has a constant outer diameter.

It is convenient that the assembly aid has at least one elevation with two flanks in an axial longitudinal section, which elevation is formed solid. The elevation extends conveniently helically around the connection part. The assembly aid advantageously comprises at least one helical groove. Preferably, the assembly aid comprises two helical grooves in the form of a double helix. The helical groove preferably comprises one to twelve full rotations, and more preferably two to eight full rotations. The assembly aid conveniently has two projections formed in such a way that the heating wire in the region of these projections is S-shaped. Preferably, at least one projection is part of a helical elevation. It is preferred that at least one projection is arranged at one end of the assembly aid.

It is within the scope of the present disclosure that the assembly aid has a material bonding with the encapsulation at least in a partial area. It is possible, that the assembly aid has been fully liquefied by molding with the encapsulation material and has a corresponding material bonding with the encapsulation material. Preferably, the assembly aid is connected to the encapsulation in one piece. It is preferred that the assembly aid is connected to the encapsulation with material bonding. Preferably, the encapsulation shrinks upon cooling. It is advantageous that the encapsulation exerts force-fitting to the assembly aid or on the connection part. Conveniently, the encapsulation covers an electrical heating means and also preferably electrical connection conductors.

It is convenient that the encapsulation extends from the middle section via a connection end to a pipe. Preferably, the pipe has an inner fluid conduit and an outer sheath. The outer sheath is preferably a corrugated pipe. Very particularly preferably, the encapsulation encloses a radially outwardly protruding element of the pipe and preferably a radially outwardly protruding element of the outer sheath. The radially outwardly protruding element is advantageously a rib. The encapsulation encloses the radially outwardly protruding element conveniently form-fittingly or form-fittingly- and force-fittingly. It is possible that at least a portion of the assembly aid is arranged between the heating means and the connection part. Conveniently, the heating means is arranged on the outside of the assembly aid. According to a very particularly preferred embodiment, the assembly aid and the encapsulation enclose the heating means without a chamber. The term "without a chamber" means artificially created cavities, which is to be understood, in particular, as no air inclusions in the form of bubbles. According to one embodiment, the encapsulation has at least two partial shells. The two partial shells are preferably two half-shells. The two partial shells can be connected via corresponding latching means. Conveniently, the two partial shells are connected with each other by a film hinge.

According to a particularly preferred embodiment, the encapsulation comprises a thermoplastic material and, in particular, a thermoplastic elastomer. Here, it is particularly preferred that the material of the encapsulation corresponds to the material of the assembly aid. Preferably, the encapsulation comprises an olefin-based thermoplastic elastomer and/or an olefin-based crosslinked thermoplastic elastomer and/or a urethane-based thermoplastic elastomer, and/or a thermoplastic polyester elastomer and/or a thermoplastic copolyester and/or styrene block copolymers and/or thermoplastic copolyamides. It is advantageous that the connection part consists of a thermoplastic material. Preferably, the connection part comprises polyamide and/or polyphthalamide.

To solve the technical problem that we have discovered, the present disclosure teaches a method for producing a connector, in particular, a connector according to the present disclosure, wherein the connector comprises a connection part, an assembly aid and an encapsulation, wherein the connection part comprises two connection ends, wherein an inner channel connects the connection ends with each other for the passage of a fluid medium, wherein the connection part has a middle section between the connection ends, wherein the assembly aid is arranged at least in a partial area of the middle section on the outer side of the connection part, wherein a heating means is arranged on the assembly aid, wherein the encapsulation covers at least a portion of the heating means, wherein the assembly aid is sprayed around the connection part, and wherein the assembly aid shrinks after molding, so that force-fitting between the assembly aid and the connection part is formed.

According to a preferred embodiment, the temperature of the assembly aid material during the molding of the assembly aid is lower than the melting temperature TMA of the connection part material. Preferably, the temperature of the heated assembly aid material is such that no material bonding takes place with the connection part. It is within the scope of the present disclosure that the assembly aid shrinks in the radial direction by 0.1 to 20%, preferably 0.2 to 10%, and particularly preferably by 0.5 to 5% when being cooled. Since the assembly aid sits on the connection part, such shrinkage is usually difficult to see with the naked eye. However, the assembly aid preferably has a correspondingly strong tension.

According to a preferred embodiment, the encapsulation is at least sprayed around the heating means. Preferably, the encapsulation covers a large portion of the middle section. Preferably, the temperature of the heated encapsulating material during the molding of the encapsulation is lower than the melting temperature $T_{MA}$ of the connection part material. It is advantageous that the temperature of the heated encapsulating material during the molding of the encapsulation is higher than or equal to the melting temperature $T_{MM}$ of the assembly aid material. It is particularly preferred that the encapsulation material forms a material bonding with the assembly aid material during molding. It is particularly advantageous if the encapsulation material shrinks upon cooling after molding, that force-fitting on the assembly aid or on the connection part is formed. According to a particularly preferred embodiment, the encapsulation encloses the heating means in a form-fitting manner. It is preferred that the encapsulation encloses the heating means force-fittingly. It is within the scope of the present disclosure that the connection part is a spray-molded part and the assembly aid is arranged on the connection part by means of multi-component spray molding.

BRIEF DESCRIPTION OF THE DRAWINGS

In the following, the present disclosure will be explained in more detail with reference to only one embodiment illustrated in the drawings. In a schematic representation, it shows.

DETAILED DESCRIPTION

Figure 1:
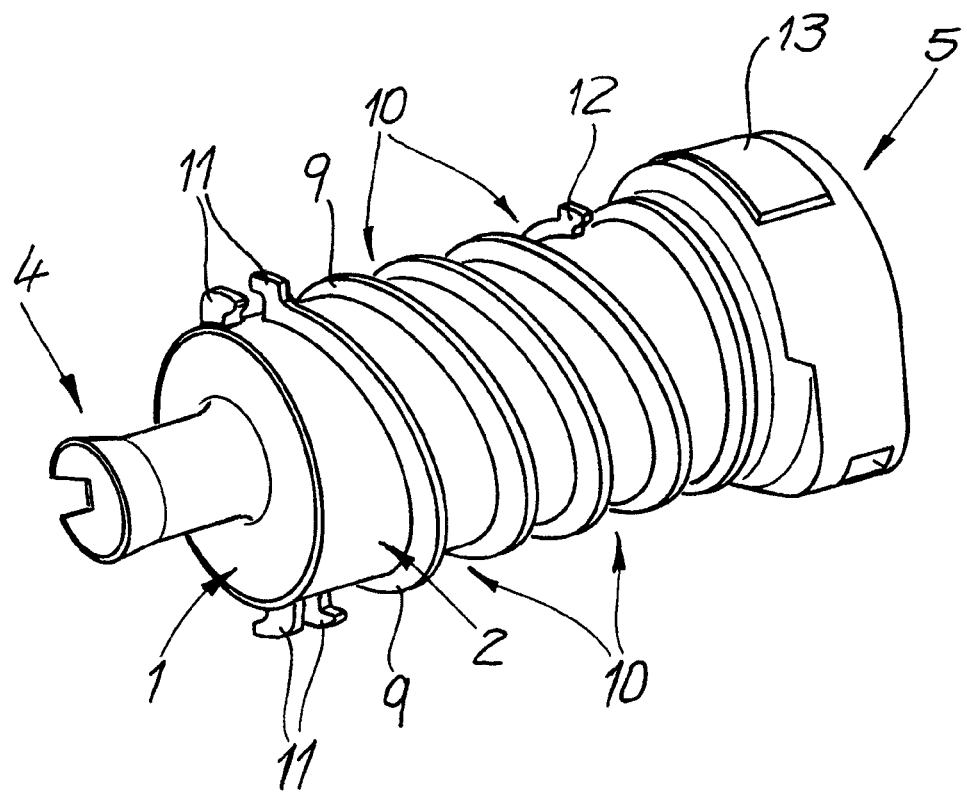
FIG. 1 a perspective view of the connector according to the present disclosure without heating means and encapsulation.

Now, a preferred embodiment of the present disclosure will be described in conjunction with the accompanying drawings. The sizes, materials, and other specific numerical values in the following description of the embodiment are simply by way of examples for ease of understanding of the present disclosure and should not be construed to limit the present disclosure unless otherwise specified. Note that in the description and the drawings, components having substantially the same functions and configurations are designated by the same reference characters, so that their description is not repeated, while components not directly relevant to the present disclosure are not shown.

Figure 2:
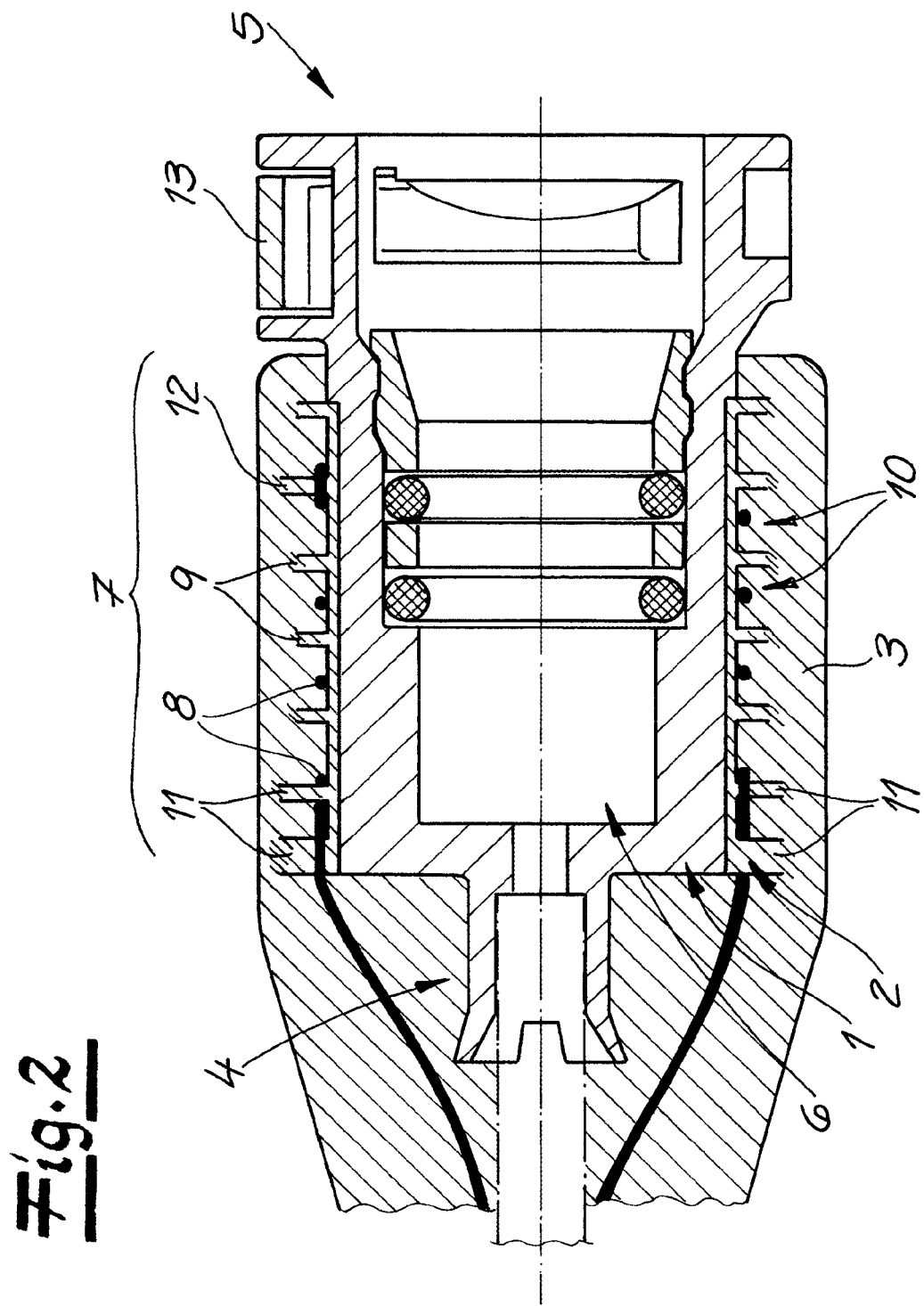
FIG. 2 a longitudinal section through the connector of FIG. 1 after wrapping with a heating wire and after molding of the encapsulation.

In FIG. 1, a quick connector according to the present disclosure, comprising a connection part 1 as well as an assembly aid 2 is shown. The connection part 1 comprises two connection ends 4, 5, wherein the left connection end 4 is so formed that there an unillustrated pipe is inserted. The pipe is fastened to the connection end 4, for example, by means of laser beam welding. Between the connection ends 4 and 5, there is a cylindrically formed middle section 7 of the connection part 1 (see. FIG. 2). The connection end 5 is a female plug part and formed accordingly to accommodate a male plug part, which is also not shown. The male plug part has a ring-shaped elevation on the outer side, which allows a snap in interaction with a latching element 13 of the connection end 5. The male plug part is, for example, an element of a fluid component (tank, pump, nozzle, or the like) or a part of another pipe.

The connection part 1 is produced by means of spray-molding and preferably consists of polyamide. The assembly aid 2 is spray-molded around the connection part 1 by means of multi-component spray-molding and consists of a thermoplastic elastomer. Here, the temperature of the liquid assembly aid material during molding is lower than the melting temperature $T_{MA}$ of the connection part material. In this way, a material bonding between the assembly aid material and the connection part material is prevented. After molding, the assembly aid material cools down, so that the assembly aid 2 undergoes a shrinkage by 2 to 3%. Due to the firmly formed connection part 1, this shrinkage is not manifested in a reduction in the size of the assembly aid 2, but in that, the assembly aid 2 is exposed to a fully circumferentially radially oriented tension along the entire length of the assembly aid 2. This tension causes the force-fitting of the assembly aid 2 on the connection part 1 in association with the high friction coefficient of the thermoplastic elastomer of the assembly aid 2.

By force-fitting, the assembly aid 2 is fastened on the connection part 1, so that then the prefabricated connector can be connected to the pipe. The pipe has two heating wires double-helically wound around the outer skin of the pipe, the ends of which protrude a little way over the pipe end. The protruding heating wire is then wound around the projections 11 of the assembly aid 2, so that the heating wire 8 is s-shaped in this area. In the embodiment shown in FIG. 1, the assembly aid 2 has two areas, each with two projections 11, since there are two heating wires around the pipe.

After the heating wires are placed in an s-shape around the projections 11, they are led along two helical grooves 10, which are formed by two helical elevations 9 of the assembly aid 2. The result of the helical winding with the heating wire 8 or the heating wires 8 can be seen in FIG. 2. By means of a projecting end 12 of a helical elevation 9, the heating wire 8 is deflected and led back along the second helical groove 10 in the direction of the pipe or connection conductor. The heating wire 8 and the heating wires 8, in particular, heat an inner channel 6, in order to prevent the freezing of a urea solution in this way. The electrical connection conductors for the heating wires 8 are not shown, but in FIG. 2.

After arranging the heating wire 8 or the heating wires 8 on the connector together with electrical connection, the encapsulation 3 is sprayed around the aggregate of the connection part 1, the assembly aid 2, the heating wires 8 and an inner fluid conduit of the pipe shown in FIG. 2 with dash-dot lines. The encapsulation 3 consists of the same material as the assembly aid 2, i.e., a thermoplastic elastomer. The temperature of the heated and liquid thermoplastic elastomer is lower than the melting temperature $T_{MA}$ of the connection part 1, so that the softening of the surface of the connection part 1 is not expected.

By molding, the encapsulation 3 encloses the internal components in a form-fitting manner and provides a good protection, in particular, for the heating wire 8 or the heating wires 8. The temperature of the liquid encapsulation-material during molding is so selected that at the same time the assembly aid 2 is heated to partial or complete liquefaction. As a result, the assembly aid 2 and the encapsulation 3 enter into a material bonding. The material bonding is shown schematically in FIG. 2 by the tips of the projections 11 or helical elevations 9 without completion. But, the material bonding can also extend to the bottoms of the helical grooves 10 particularly. This ensures that the heating wire 8 or the heating wires 8 are very tightly enclosed by the thermoplastic elastomer and are also protected appropriately well from the effect of moisture. Moreover, the encapsulation 3 also undergoes a shrinkage, whereby force-fitting is applied to the internal components. As a result, the fluid density increases. In addition, the force-fitting is conducive to the stability of the entire connector, and in particular, for the fixation of the heating wire 8 or heating wires 8.

The invention claimed is:

1. A quick connector for a fluid medium of a motor vehicle, wherein the connector has a connection part, an assembly aid and an encapsulation, wherein the connection part comprises two connection ends, wherein an inner channel connects the connection ends with each other for a passage of the fluid medium, wherein the connection part has a middle section between the connection ends, wherein the assembly aid is arranged at least in a partial area of the middle section on an outside of the connection part, wherein a heating means is guided on the assembly aid, wherein the encapsulation covers at least a portion of the heating means, and wherein the assembly aid is arranged by means of force-fitting on the connection part, characterized in that the assembly aid comprises a rubber-like elastic material such that the assembly aid is stretchable by hand in an axial direction or a radial direction.

2. The connector according to claim 1, wherein the assembly aid forms a material bonding with the encapsulation at least in a partial area.

3. The connector according to claim 1, wherein the assembly aid comprises a thermoplastic elastomer.

4. The connector according to claim 1, wherein the encapsulation consists of a thermoplastic elastomer.

5. The connector according to claim 1, wherein the connection part consists of a thermoplastic material.

6. The connector according to claim 1, wherein the melting temperature TMM of the assembly aid material is lower than the melting temperature TMA of the connection part material.

7. The connector according to claim 1, wherein on the connection part the assembly aid is under a radially oriented tension.

8. The connector according to claim 1, wherein an inner surface of the assembly aid facing the connection part is constant over at least one continuous quarter of the axial length of the assembly aid.

9. The connector according to claim 1, wherein the assembly aid has at least one elevation with two opposite flanks that is solid.

10. A method for producing a connector, wherein the connector comprises a connection part, an assembly aid and an encapsulation, wherein the connection part has two connection ends, wherein an inner channel connects the connection ends with each other for a passage of the fluid medium, wherein the connection part has a middle section between the connection ends, wherein the assembly aid is arranged at least in a partial area of the middle section on the outside of the connection part, wherein a heating means is arranged on the assembly aid, wherein the encapsulation covers at least a portion of the heating means, wherein the assembly aid is injection molded around the connection part, and wherein the assembly aid shrinks after molding to form a force-fit between the assembly aid and the connection part, characterized in that the assembly aid comprises a rubber-like elastic material such that the assembly aid is stretchable by hand in an axial direction or a radial direction.

11. The method of claim 10, wherein a temperature of the assembly aid material during the injection molding of the assembly aid is lower than the melting temperature TMA of the connection part material.

12. The method according to claim 11, wherein the connection part is an injection part and the assembly aid is arranged on the connection part by multi-component injection molding.

13. The method according to claim 10, wherein the assembly aid shrinks in the radial direction by 0.1 to 20% during cooling.

14. The method according to claim 10, wherein the encapsulation is injection molded at least around the heating means.

* * * * *